US008528058B2

(12) United States Patent  (10) Patent No.: US 8,528,058 B2
Zhu et al.  (45) Date of Patent: Sep. 3, 2013

(54) NATIVE USE OF WEB SERVICE PROTOCOLS AND CLAIMS IN SERVER AUTHENTICATION

(75) Inventors: Liqiang Zhu, Kirkland, WA (US); Gennady Medvinsky, Redmond, WA (US); Tanmoy Dutta, Sammamish, WA (US); Cristian Ilac, Sammamish, WA (US); Andreas Luther, Kirkland, WA (US); John P Shewchuk, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1121 days.

(21) Appl. No.: 11/755,968

(22) Filed: May 31, 2007

(65) Prior Publication Data

US 2008/0301784 A1  Dec. 4, 2008

(51) Int. Cl.
*H04L 29/06* (2006.01)
(52) U.S. Cl.
USPC ............. 726/5; 726/1; 726/3; 726/18
(58) Field of Classification Search
USPC .............................................. 726/5
See application file for complete search history.

(56) References Cited

U.S. PATENT DOCUMENTS

| | | | | |
|---|---|---|---|---|
| 5,901,284 | A | * | 5/1999 | Hamdy-Swink .................. 726/5 |
| 6,154,766 | A | * | 11/2000 | Yost et al. ....................... 709/201 |
| 6,859,879 | B2 | * | 2/2005 | Henn et al. ......................... 726/1 |
| 7,210,167 | B2 | * | 4/2007 | Brezak et al. .................... 726/18 |
| 7,463,637 | B2 | * | 12/2008 | Bou-Diab et al. ............. 370/401 |
| 7,516,482 | B2 | * | 4/2009 | Wheeler ........................... 726/4 |
| 2003/0023766 | A1 | * | 1/2003 | Elnozahy ....................... 709/310 |
| 2003/0084350 | A1 | | 5/2003 | Eibach et al. |
| 2003/0135628 | A1 | | 7/2003 | Fletcher et al. |
| 2004/0107360 | A1 | | 6/2004 | Herrmann et al. |
| 2005/0044197 | A1 | | 2/2005 | Lai |
| 2005/0154889 | A1 | | 7/2005 | Ashley et al. |
| 2005/0228984 | A1 | | 10/2005 | Edery et al. |
| 2005/0251853 | A1 | | 11/2005 | Bhargavan et al. |
| 2005/0268308 | A1 | | 12/2005 | Tang et al. |
| 2005/0268333 | A1 | | 12/2005 | Betts et al. |
| 2006/0021018 | A1 | * | 1/2006 | Hinton et al. ................... 726/10 |
| 2006/0041669 | A1 | | 2/2006 | Bemmel et al. |
| 2006/0053124 | A1 | | 3/2006 | Nishio et al. |

(Continued)

OTHER PUBLICATIONS

Abdelkarim Erradi, P Maheshwar, AdaptiveBPEL: A policy-driven middleware for flexible web services composition of Middleware for Web Services (MWS), 2005—pp. 5-12.*

(Continued)

*Primary Examiner* — Michael Simitoski
*Assistant Examiner* — Ali Shayanfar (57) ABSTRACT

Architecture for natively authenticating a client application to a web server via HTTP authentication. The Web Services Architecture, and more specifically, Web Services Security, is leveraged to enable legacy applications to access web services transparently to the existing legacy applications. A security support provider (SSP) is created that employs WS-* protocol to at least emulate ws-trust and ws-mex thereby enabling policy exchange via an HTTP protocol stack. Policy can be exchanged via a WWW-Authenticate header enabling legacy applications to use the WS-* family of protocols without modifying the client application. The WS-* protocols are abstracted into a generic programming interface for native client application use.

20 Claims, 9 Drawing Sheets

(56) References Cited

U.S. PATENT DOCUMENTS

| | | | |
|---|---|---|---|
| 2006/0101146 A1* | 5/2006 | Wang | 709/227 |
| 2006/0206567 A1* | 9/2006 | Milligan et al. | 709/206 |
| 2006/0206932 A1 | 9/2006 | Chong | |
| 2007/0011733 A1* | 1/2007 | Gbadegesin et al. | 726/11 |
| 2007/0033283 A1* | 2/2007 | Brown | 709/226 |
| 2007/0277231 A1* | 11/2007 | Medvinsky et al. | 726/5 |
| 2008/0005783 A1* | 1/2008 | Polzin et al. | 726/3 |
| 2008/0069082 A1* | 3/2008 | Patrick | 370/351 |
| 2008/0263640 A1* | 10/2008 | Brown | 726/5 |

OTHER PUBLICATIONS

"What's New in Enterprise UDDI Services", Jul. 24, 2002, Microsoft Corporation, 2007, pp. 1-5.

"Authenticating Web Services Clients Using HTTP Basic Authentication", IBM Corporation, 2006, pp. 1-2.

"Configure HTTP Basic Authentication for Web Services", available at least as early as Mar. 21, 2007 at <<http://publib.boulder.ibm.com/infocenter/iseries/v5r3/index.jsp?topic=/rzatz/51/webserv/wssec-cfahttp.htm>>, pp. 1-2.

* cited by examiner

NATIVE USE OF WEB SERVICE PROTOCOLS AND CLAIMS IN SERVER AUTHENTICATION

BACKGROUND

Publicly accessible IP networks and associated networks services have been a boon to users and businesses alike by placing users in communication with not only other users, but also commercial goods and services. Web applications have evolved from basic content delivery mechanisms into productivity tools and as a means for application integration across the corporation enterprise. No longer is it a requirement that individuals travel to face-to-face meetings to obtain meaningful collaboration. This capability is particularly useful for inter-corporate communications. However, the ability to accommodate such user access becomes more complicated.

A way for allowing businesses to directly provide services for customers registered at other (partner) businesses or institutions is federation. Within a federation of services, a business can get trusted information about a user from the user's home organization (or information-providing service). The business does not need to register and maintain that user's identity, and the user is spared from having to register and remember a new login information order to interact with the business. Thus, a user can seamlessly traverse different websites within partner organizations based on a single sign-on. For example, consider Company A and Company B which may have a business relationship but that the level of trust for data access should be managed. It is desired that each person in Company A should not have access to Company B documents, and vice versa. However, there are instances where employees of the companies may need to collaborate. In other words, it is commonplace for an employee of Company A to have a working relationship with an employee of Company B. Because of the trust relationships developed between federation participants, a participant is able to authenticate a user, and then act as an issuing party for that user thereby making other federation participants relying parties.

However, it is undesirable for a corporation to have to devote the human resources to allow discriminatory access by an outside entity to internal networks because it not only complicates the management of information but can potentially provide a means of unauthorized or even inadvertent access to company data.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides support for natively authenticating a client application to a web server via HTTP authentication. A security support provider (SSP) is created as a plug-in to a client security subsystem. The created SSP is a plug-in model that provides seamless HTTP authentication without any change in the client application.

The Web Services Architecture, and more specifically, Web Services Security, is leveraged to enable legacy applications to access web services transparently to the user. The SSP created employs WS-* protocols to at least emulate ws-trust and ws-mex thereby enabling policy exchange via an HTTP protocol stack. Policy can be exchanged via a WWW-Authenticate header enabling legacy applications to use the WS-* family of protocols without modifying the client application. The WS-* protocols are abstracted into a generic programming interface for native client application use.

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The disclosed architecture leverages the Web Services Architecture, and more specifically, Web Services Security, to enable legacy applications to access web services natively, and thus, transparently to the user. Web Services provide a standard means of interoperating between different software applications, running on a variety of platforms and/or frameworks.

A security support provider (SSP) is created that emulates ws-trust and ws-mex thereby enabling policy exchange via an HTTP protocol stack. In other words, policy can be exchanged via a WWW-Authenticate header. This enables legacy applications to use the WS-* family of protocols without modifying the client application. The WS-* protocols are abstracted into a generic programming interface for native client application use.

The architecture finds particular applicability to federation environments. Federation is a mechanism that allows a user to seamlessly traverse different websites within partner organizations based on a single-sign-on. Users from different partner organizations can be validated and provided with seamless access to websites within that trusted federation without requiring re-authentication. Active Directory Federation Service (ADFS) by Microsoft Corporation is provided to solve what is known in the authentication world as the federation problem, that is, the sharing of trust relationships among enterprise and/or partner websites without requiring account creation at each site. The created SSP is a plug-in model that handles ADFS-type or like communications providing seamless HTTP authentication without any change in application. This is described in more detail below.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

Figure 1:
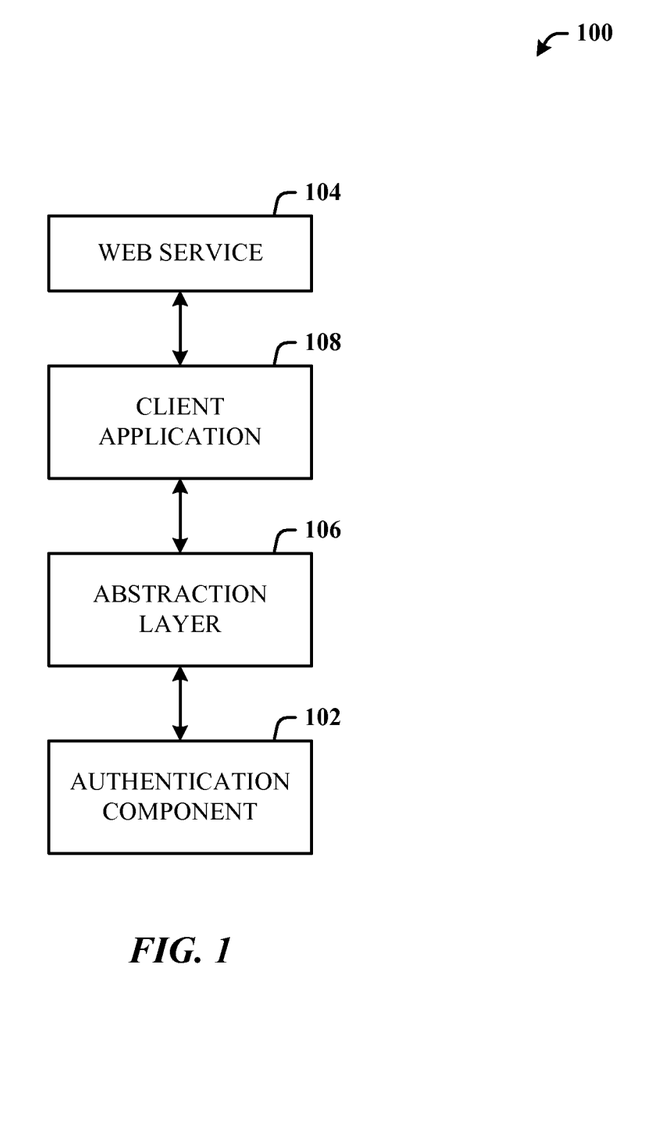
FIG. 1 illustrates a computer-implemented authentication system.

Referring initially to the drawings, FIG. 1 illustrates a computer-implemented authentication system 100. The system 100 includes an authentication component 102 for providing claims-based authentication to a web service 104. The system 100 also includes an abstraction layer 106 for exposing the authentication capability to a client application 108 for natively accessing the web service 104.

The authentication component 102 provides claims-based authentication via HTTP (hypertext transfer protocol). The authentication component 102 can include an SSP that emulates web services trust protocol (ws-trust), which uses the secure messaging mechanisms of WS-Security to define additional primitives and extensions for security token exchange to enable the issuance and dissemination of credentials within different trust domains. The SSP can also emulate WS-MetadataExchange (ws-mex) which enables service consumers to retrieve metadata for a given web service prior to using it.

The SSP facilitates policy exchange with the web service 104, where the policy exchange is via an authenticate header and an unauthorized status code (e.g., 401). The policy exchange facilitates selection of a digital identity (e.g., a claim) by the client application 108 when natively authenticating to the web service 104. The digital identity selected is a best-fit for authentication to the web service 104. The client application 108 retries the HTTP request in response to receiving the authenticate header from the web service 104.

Figure 2:
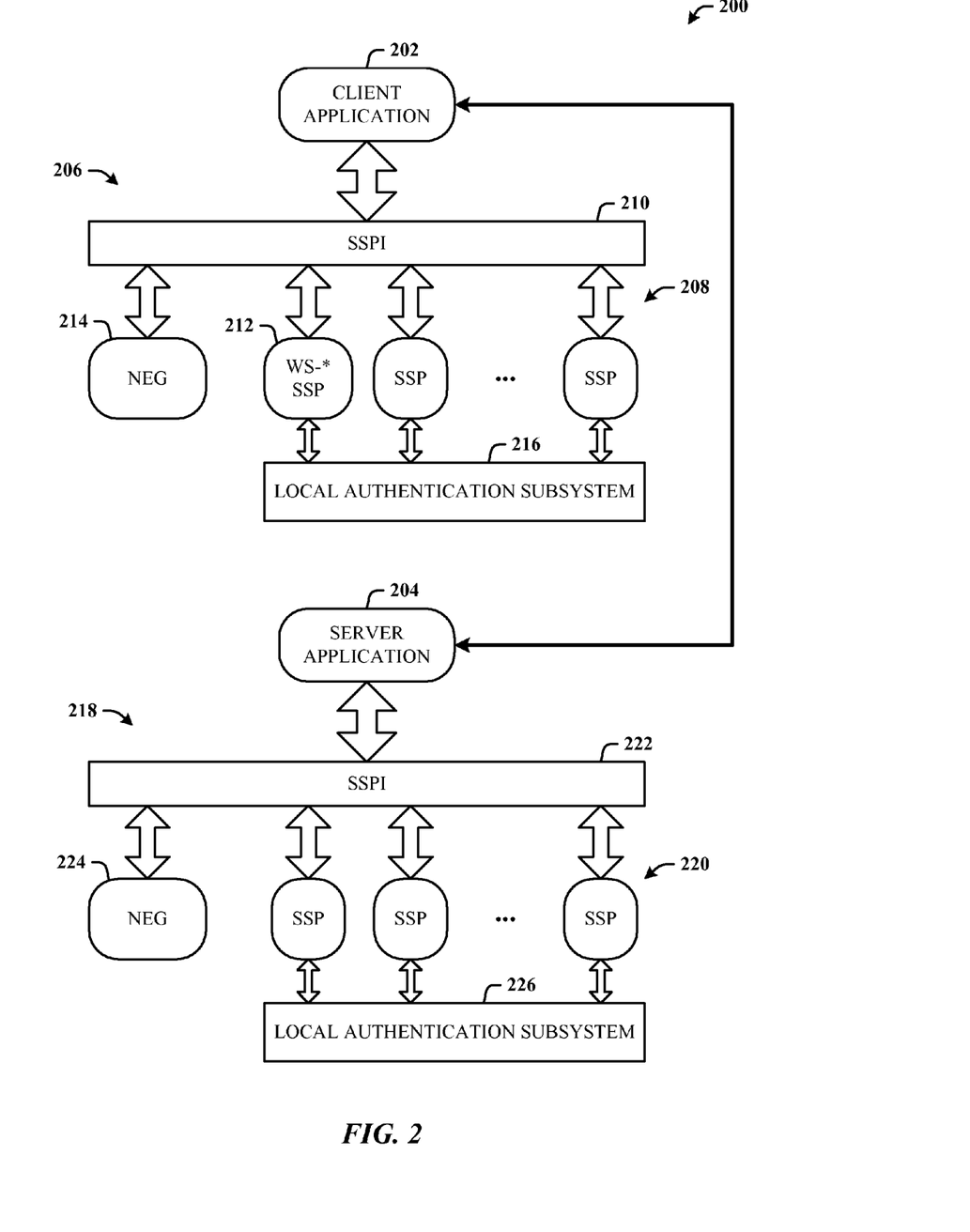
FIG. 2 illustrates a more detailed implementation of a system for claims-based HTTP authentication between a client and a server.

FIG. 2 illustrates a more detailed implementation of a system 200 for claims-based HTTP authentication between a client 202 and a server 204. The client application 202 is associated with a noninteractive security subsystem 206 (e.g., via the client operating system). For example, the client application 202 can be a word processor application via which a client user seeks to access the server-based application 204. However, before this can occur, a trust relationship should be established.

In support thereof, the security subsystem 206 includes an SSP architecture that makes available to the client application 202 (and other applications) one or more security packages in the form of SSPs 208. The SSPs 208 are exposed to the client application 202 via a security support provider interface (SSPI) 210. The SSPI 210 provides one or more APIs for authenticating a user, and acquiring credentials for the authentication. In other words, the SSPI 210 allows the application 202 to use the various security packages available on a computer or network without changing the interface to the security subsystem 206. Each SSP 208 provides mappings between application SSPI function calls and actual security model functions. The SSPI 210 provides a common interface between transport-level applications such as remote procedure call (RPC), and the SSPs 208. The SSPI 210 allows the transport application to call one of several SSPs 208 to obtain an authenticated connection.

The security subsystem 206 includes a WS-* SSP 212 which provides the abstraction of the WS protocols for native use by the client application 202. For example, the SSP 212 can emulate the ws-trust and ws-mex functionality described above, and enables policy exchange between the client application 202 and the server application 204 (or web service). Negotiation for the most suitable provider 208 is handled through a negotiator 214 (denoted NEG, e.g., SPNEGO—simple and protected negotiation). As previously indicated, there is some negotiation between the client 202 and the server 204 before authentication begins.

The security subsystem 206 also includes a local authentication subsystem 216 that includes authentication packages (that implement different authentication protocols) and an authentication database (for storing authentication credentials used during the authentication process).

The server application 204 can be associated with a similar noninteractive security subsystem 218 (e.g., via the server operating system). For example, the server application 204 can be a collaboration application which the client user seeks to access. In support thereof, the security subsystem 218 includes an SSP architecture that makes available to the server application 204 (and other applications) one or more security packages in the form of server-side SSPs 220. The SSPs 220 are exposed to the server application 204 via a sever-side SSPI 222. The SSPI 222 provides one or more APIs for authenticating a user, and managing credentials for the authentication process. In other words, the SSPI 222 allows the server application 204 to use the various security packages available on a computer or network without changing the interface to the security subsystem 218. Each SSP 220 provides mappings between application SSPI function calls and actual security model functions. The SSPI 222 provides a common interface between transport-level applications such as RPC, and SSPs. The SSPI 222 allows the transport application to call one of several SSPs 220 to manage an authenticated connection.

Negotiation for an SSP 220 is handled through a server-side negotiator SSP 224 (denoted NEG, e.g., SPNEGO). As previously indicated, there is some negotiation between the client 202 and the server 204 before authentication begins. Accordingly, the security subsystem 218 also includes a local server-side authentication subsystem 226 that includes authentication packages (that implement different authentication protocols) and an authentication database (for storing authentication credentials used during the authentication process).

Figure 3:
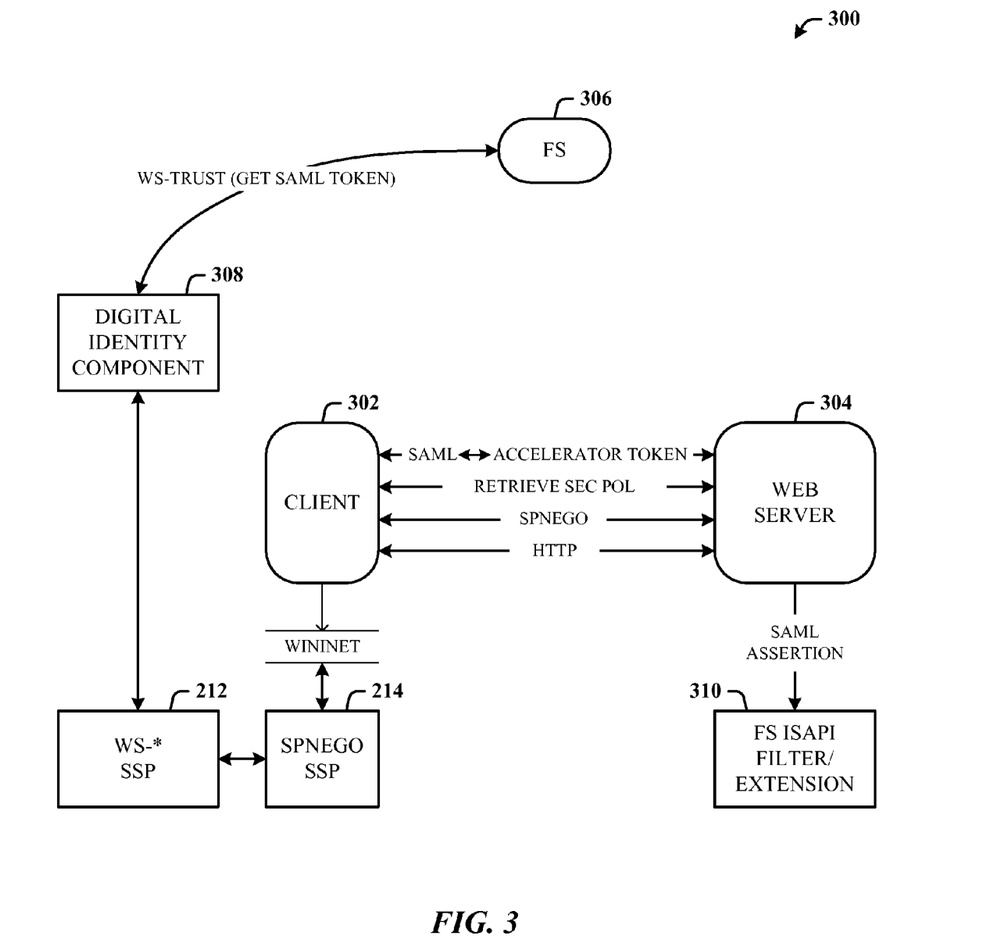
FIG. 3 illustrates a federation implementation of a system for native client application access and claims-based HTTP authentication.

FIG. 3 illustrates a federation implementation of a system 300 for native client application access and claims-based HTTP authentication. Here, a client 302 seeks access to a web server 304. Rather than having to register and create a separate account to access the web server 304, the system 300 includes federation services 306 (e.g., ADFS). The federation service 306 can be based on the Web Services Architecture, which is defined in WS-* specifications, and facilitates use of a single sign-on (SSO) to authenticate users to multiple, related web applications over the life of a single online session. The federation services 306 accomplish this by securely sharing digital identity and entitlement rights (or claims) via a digital identity component 308 across an organization's security and enterprise boundaries. This further extends the functionality to Internet-facing applications enabling customers, partners, and suppliers to have a similar, streamlined, web SSO experience when accessing the organization's web-based applications.

The federated services 306 provide federated identity management that interoperates with security products that support the WS-* Web Services Architecture by employing the federation specification of WS-*, called WS-Federation. The federated services 306 can also support a security assertion markup language (SAML) token type and Kerberos authentication, and perform claim mapping, for example, modifying claims using custom business logic as a variable in an access request. Claims are statements (e.g., name, identity, key, group, privilege, and/or capability) made about users that are used for authorization purposes in an application.

CardSpace™, by Microsoft Corporation, is a framework which securely stores digital identities (or claims) of a person, and can provide a unified interface for choosing the identity for a particular transaction, such as logging in to a website (e.g., the web server 304). CardSpace can be employed for the digital identity component 308. For example, when a CardSpace-enabled application (e.g., client 302) or website (e.g., web server 304) wishes to obtain personal information about the client user, the client 302 (or website) can require a particular set of claims and/or a particular token type from the user. The user can select a "card" of identity information to use and the CardSpace software contacts the issuer of the identity to obtain a digitally-signed token (e.g., XML) that contains the requested information.

The identity component 308 can employ a web services protocol stack and XML-based protocols, including WS-Security, WS-Trust, WS-MetadataExchange and WS-SecurityPolicy.

In operation, the client user seeks access to the web server 304. The client 302 sends a request to the server 304, and the server 304 responds with a token requesting the claims information needed, and a security policy. The client 302 accesses the negotiate SSP 214, which further calls the WS-* SSP 212 for accessing the identity information 308 from the federated services 306, using a ws-trust protocol to get an SAML token with the digital identity data 308. The claims information obtained via the identity component 308 is then returned to the client 302, and from the client 302 to the web server 304. Once the suitable claims have been obtained, the client 302 can access the server 304 based on the credentials obtained from the federated services 306. The server 304 is associated with a federated services filter/extension 310 (e.g., ISAPI—Internet server application programming interface).

Figure 4:
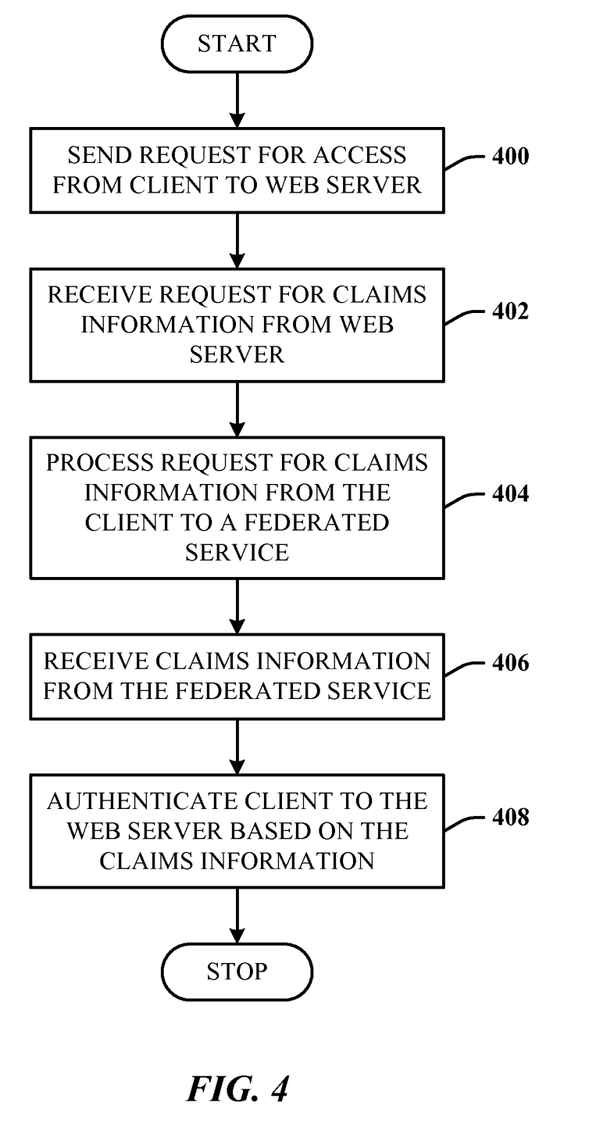
FIG. 4 illustrates a method of authenticating a client.

FIG. 4 illustrates a method of authenticating a client. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

At 400, a client sends a request for access to a web server. At 402, the client receives a request for claims information from the web server. At 404, the client processes the request for claims information to a federated service. At 406, the client receives the claims information from the federated service. At 408, the client is authenticated to the web server based on the claims information. The client is authenticated to the web server natively and using HTTP authentication.

Figure 5A:
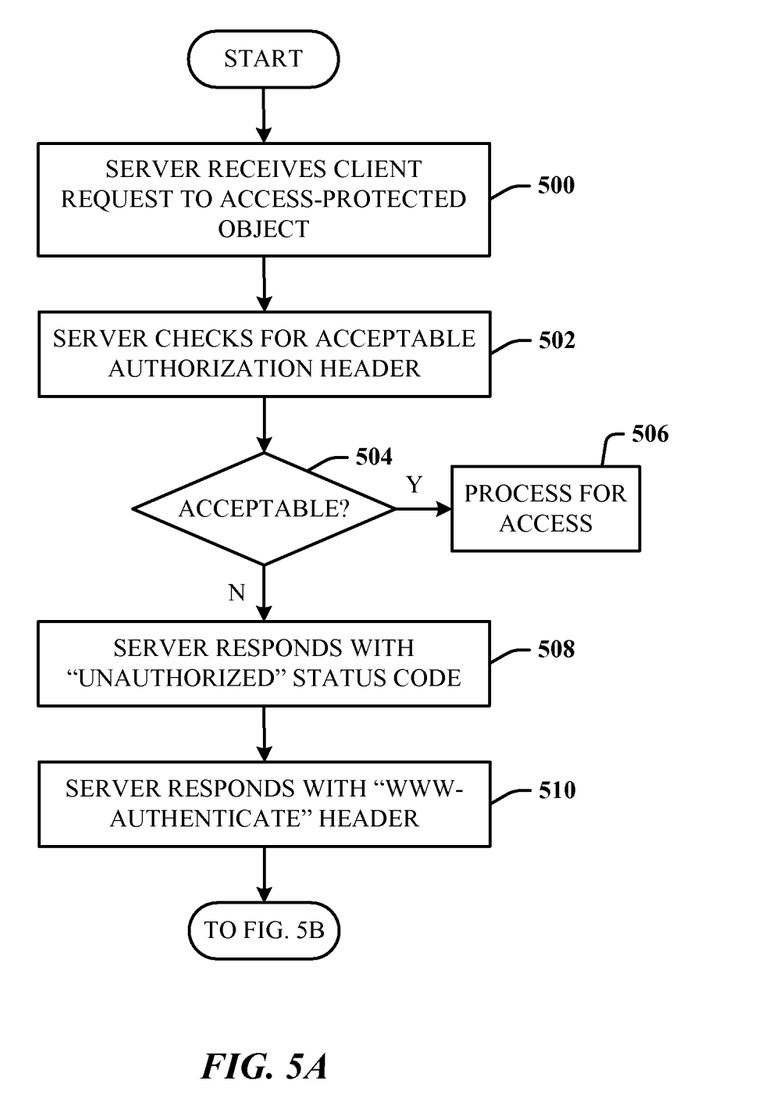
FIG. 5A and FIG. 5B illustrate a method of natively authenticating a client application using HTTP authentication.
Figure 5B:
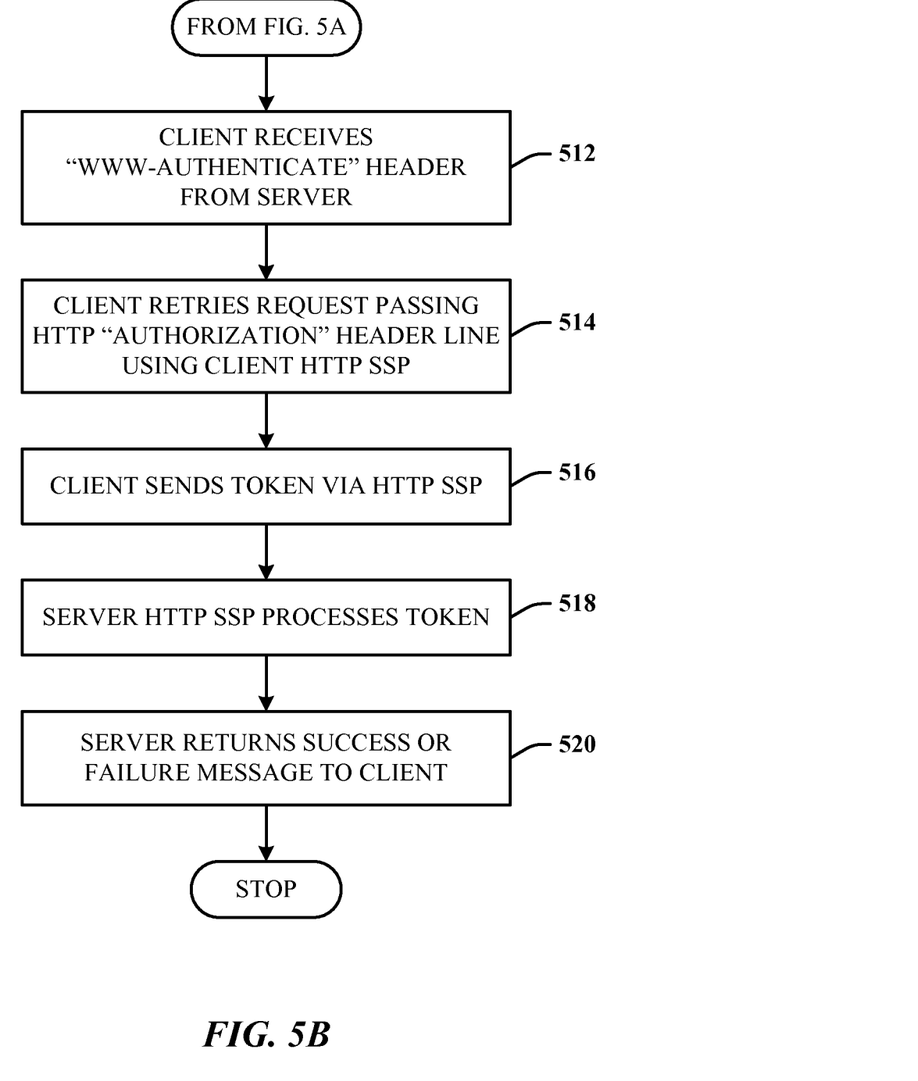

FIG. 5A and FIG. 5B illustrate a method of natively authenticating a client application using HTTP authentication. The WS-* SSP 212 of FIG. 3 is a new SSP managed by the Negotiate SSP 214. The Initial WWW-Authenticate Response Header by the server can be as follows. At 500, the server receives a request for an access-protected object. At 502, the server checks for an acceptable authorization header. At 504, if acceptable, flow is to 506 to process the request for access. Alternatively, if an acceptable Authorization header has not been sent, flow is from 504 to 508, where the server responds with a "401 Unauthorized" status code, and a "WWW-Authenticate:" header, as indicated at 510.

The authentication data in the initial challenge can contain an ASN.1 (abstract syntax notation number one) structure NegTokenInit2 encoded in DER (distinguished encoding rules) and then encoded again in Base64 (a popular encoding method that encodes binary data into US-ASCII strings).

```
NegTokenInit2 ::= SEQUENCE {
    mechTypes[0] MechTypeList OPTIONAL,
    negHints [3] NegHints,
    ...
}
where NegHints is defined as follows:
    NegHints ::= SEQUENCE {
        hintName[0] GeneralString OPTIONAL,
        hintAddress[1] OCTET STRING OPTIONAL
    }
```

The mechTypes contains the list of object identifiers for the available SSPs managed by the Negotiate SSP. The object identifier for the WS-* SSP is chosen 1.3.6.1.4.1.311.2.2.25. The hintAddress can contain the following structure:

```
typedef struct _LAPKG_POLICY_TOKEN
{
    ULONG cbHeadSize;
    ULONG flags;
    ULONG certOffset;
    ULONG certLength;
    ULONG issuedTokenParametersOffset;
    ULONG issuedTokenParametersLength;
} LAPKG_POLICY_TOKEN,*PLAPKG_POLICY_TOKEN;
``` where the following apply: cbHeadSize field is filled out using the size of LAPKG_POLICY_TOKEN and it is encoded in little endian order; the flags field is reserved and contains all zeros; the certOffset field contains the offset in little endian order for the server's SSL/TLS certificate starting at the beginning of the LAPKG_POLICY_TOKEN structure; the certLength field contains the length of the certificate in little endian order; the server's SSL/TLS X.509 certificate immediately follows the LAPKG_POLICY_TOKEN structure; the issuedTokenParametersOffset and the issuedTokenParametersLength field describes the types of claims used in the SAML (security assertion markup language) token, and both are encoded in little endian order. SAML is an XML standard for exchanging authorization and authentication data between security entities (e.g., a provider of assertions and a consumer of assertions).

The policy values in the server's initial response can facilitate the client picking the best-fit claims when authenticating the client to the server.

Moving to FIG. 5B, upon receipt of the response containing a "WWW-Authenticate" header from the server at 512, the client is expected to retry the HTTP request, passing an HTTP "Authorization" header line, as indicated at 514. The GSS-API (generic security services application program interface) data form the client contains the negotiate token and then Base64 encoded, as indicated at 516. In the client request, the token LAPKG_POLICY_TOKEN structure is encapsulated in the mechToken field of the NegTokenInit.

```
typedef struct _LAPKG_AUTH_TOKEN
{
    ULONG cbHeadSize;
    ULONG flags;
    FILETIME createDate;
    FILETIME expiryDate;
    ULONG xmlTokenOffset;
    ULONG xmlTokenLength;
    ULONG internalTokenReferenceOffset;
    ULONG internalTokenReferenceLength;
    ULONG externalTokenReferenceOffset;
    ULONG externalTokenReferenceLength;
    ULONG serverCertThumbPrintOffset;
    ULONG serverCertThumbPrintLength;
} LAPKG_AUTH_TOKEN,*PLAPKG_AUTH_TOKEN;
```

Unless otherwise specified, all the fields are encoded in little endian order. Any offset field contains an offset of the payload message starting from the beginning of the LAPKG_AUTH_TOKEN structure.

The cbHeadSize is filled with the size of the LAPKG_AUTH_TOKEN. The flags field is reserved and unused. The createDate field contains the date when the SAML token was created. The expiryDate field contains the expiry time of the SAML token. xmlTokenOffset and xmlTokenLength describe the SAML token. serverCertThumbPrintOffset and serverCertThumbPrintLength describes the thumbprint of the SSL/TLS server sent in the initial server response. The rest of the fields are reserved and unused.

At 518, the server claims SSP processes the LAPKG_AUTH_TOKEN token, and then either returns successfully or fails with an appropriate status code, as indicated at 520. In this case, no SSPI token is returned on the server side by the SSP. The SAML token should contain the user's SAM account name. The server side client token can be generated based on that name. The rest of the protocol proceeds according to conventional mechanisms, for example, in the same way as how the Kerberos SSP works. Kerberos is a security authentication protocol that allows users communicating over a non-secure network to develop a trust relationship in a secure way.

Policy values used to generate the SAML token in the client request can be represented as the following.

```
issuedTokenParameters ::= "<wst:Claims
xmlns:wst='http://schemas.xmlsoap.org/ws/2005/02/trust'>
<wsid:ClaimType Uri='http://schemas.xmlsoap.org/ws/2005/05/identity/
claims/name' xmlns:wsid='http://schemas.xmlsoap.org/ws/2005/05/
identity'/></wst:Claims>"
privacyNoticeLink ::= ""
privacyNoticeVersion ::= 0
useManagedPresentation ::= FALSE
issuerEndpointAddress ::= "<EndpointReference
xmlns='http://www.w3.org/2005/08/addressing'> <Address>
http://{hostname}</Address><Identity xmlns
='http://schemas.xmlsoap.org/ws/2006/02/addressingidentity'> <KeyInfo
xmlns='http://www.w3.org/2000/09/xmldsig#'> <X509Data>
<X509Certificate> {server's-X.509-SSL-certificate}
</X509Certificate></X509Data></KeyInfo> </Identity>
</EndpointReference>"
``` where {hostname} is the place holder for the host name in the URL supplied by the application/user, and {server's-X.509-SSL-certificate} is the place holder for the X.509 certificate sent in the initial response from the server accompanied by the 401 status. Note that no proof of possession is performed for the SAML token by this protocol.

The WS-* SSP is a full blown SSP that is managed by the Negotiate SSP, and includes the support of all necessary SSPI primitives in both user-mode and kernel mode.

The Negotiate SSP can be modified to send the initial policy token from the web server (e.g., IIS/Sharepoint server) and pick the token on the receiver side. The policy token is supplied to the WS-* SSP client.

Following is an exemplary SSP package table populated by the WS-* SSP.

```
SECPKG_FUNCTION_TABLE LIVEGloablFunctionTable = {
    NULL,                         // InitializePackage
    NULL,                         // LogonUser
    LsaApCallPackage,             // CallPackage
    LsaApLogonTerminated,
    LsaApCallPackageUntrusted,    // CallPackageUntrusted
    NULL,                         // CallPackagePassthrough
    NULL,                         // LogonUserEx
    LsaApLogonUserEx2,            // LogonUserEx2
    SpInitialize,
    SpShutdown,
    SpGetInfo,
    SpAcceptCredentials,          // SpAcceptCredentials
    SpAcquireCredentialsHandle,
    SpQueryCredentialsAttributes,
    SpFreeCredentialsHandle,
    NULL,                         // SaveCredentials
    NULL,                         // GetCredentials
    NULL,                         // DeleteCredentials
    SpInitLsaModeContext,
    SpAcceptLsaModeContext,
    SpDeleteContext,
    NULL,                         // ApplyControlToken
    NULL,                         // GetUserInfo
    NULL,                         // GetExtendedInformation
    NULL                          // QueryLsaModeContext
};
SECPKG_USER_FUNCTION_TABLE LIVEGlobalUserFunctions =
{
    SpInstanceInit,
    SpInitUserModeContext,
    SpMakeSignature,
    SpVerifySignature,
    SpSealMessage,
    SpUnsealMessage,
    SpGetContextToken,
    SpQueryContextAttributes,
    NULL, // CompleteAuthToken
    SpDeleteUserModeContext
};
```

As described above, a client application (and not via a browser) can operate natively to access a file on a web server (e.g., a SharePoint site) based on federated site (e.g., ADFS) issued token, where the identity will be selected by the user via the server-requested claim. The policy for which STS (security token service) uses and the token type is processed under the negotiate SSP between the client and the web server.

Figure 6:
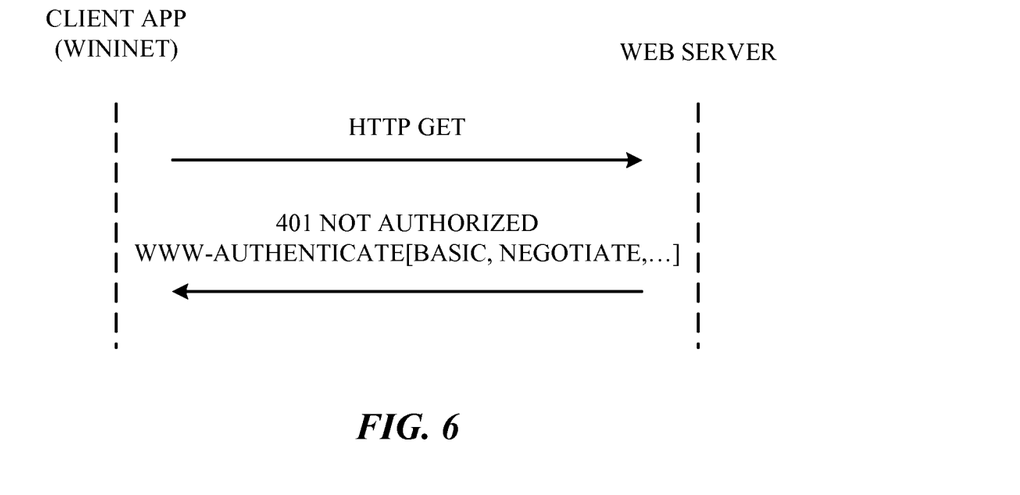
FIG. 6 illustrates message flow between a client application and a web server.
Figure 7:
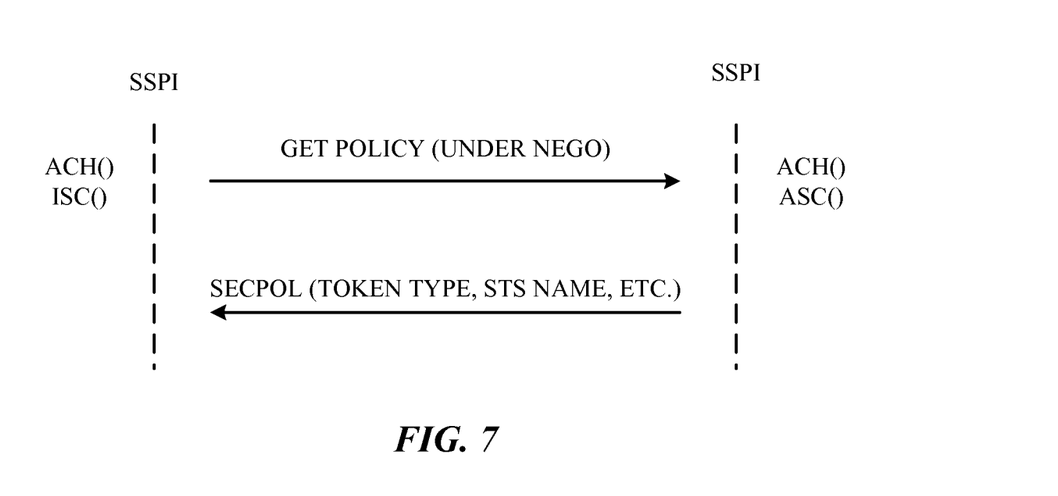
FIG. 7 illustrates message flow associated with security policy processing.

FIG. 6 illustrates message flow between a client application and a web server. Initially, the client user selects a document (e.g., a word processor document) in a web server folder which will causes the corresponding client application to launch. The client application initiates an HTTP Get requests to the web server via WINHTTP, and the web server replies, initially, with a "401 Not Authorized" message, with a WWW-Authenticate header that includes a negotiate call. FIG. 7 illustrates message flow associated with security policy processing. WINHTTP selects negotiate and uses SSPI with the Negotiate package name which will then request the security policy from the web server. This can be encapsulated in Negotiate SSP blobs. The policy can specify the STS to use, token type, etc. Next, the SSP will then call an API GetTokenEx( ) which obtains a SAML token from the STS. At this point, with the client is in possession of the SAML assertion, the remaining flow can be according to a passive federation profile.

Following are exemplary configuration settings. If the size of SSPI token is larger than the maximum header size that HTTP.SYS can handle, the default length can be changed, which could be found under HKLM\System\CurrentControlSet\Services\HTTP\Parameters. Both are double words (DWORDs) where the first word can be up to 0xFFFE (hex), the second word can be up to 0x1000000 (16 MB), and where second word is larger than the first. MaxFieldLength is a key that allows the user to set an upper limit (in bytes) for each header (where the default value is 16 KB). MaxRequestBytes is a key that establishes the upper limit on the total size of the request line and the headers (where the default value is also 16 KB).

The WS-* SSP does negotiation of claims. Following are exemplary claims supported by the HTTP SSP:

"name" claim (<wsid:ClaimType
Uri='http://schemas.xmlsoap.org/ws/2005/05/identity/claims/name'
xmlns:wsid='http://schemas.xmlsoap.org/ws/2005/05/identity' />);
and
    emailaddress claim (<wsid:ClaimType
Uri='http://schemas.xmlsoap.org/ws/2005/05/identity/claims/emailaddress'
xmlns:wsid='http://schemas.xmlsoap.org/ws/2005/05/identity' />).

This is a DWORD; if the DWORD contains a zero, the server supports the "name" claim; otherwise, the server supports the "emailaddress" claim. The default value (when this registry value is missing) is zero.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 8:
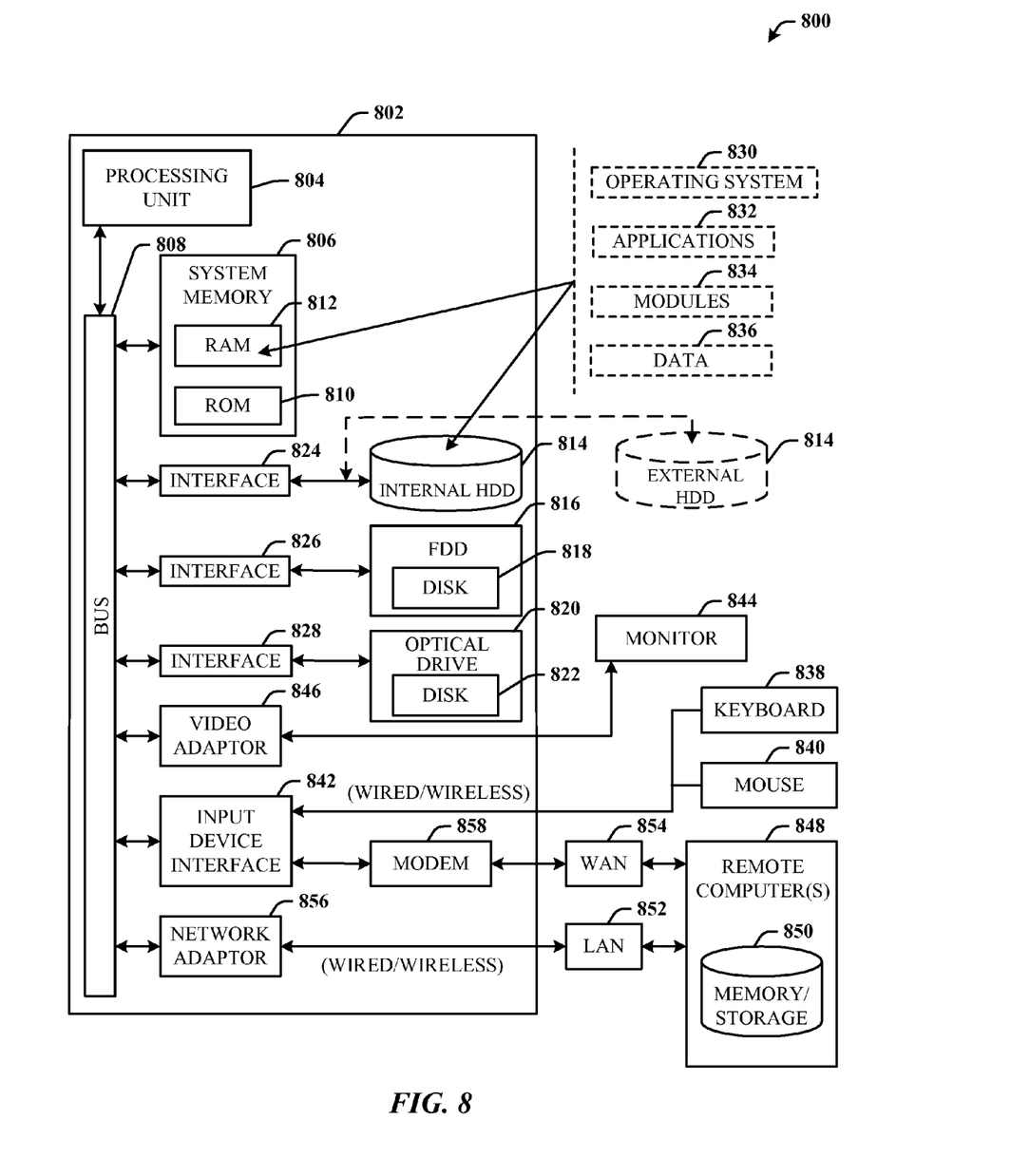
FIG. 8 illustrates a block diagram of a computing system operable to execute claims authentication in accordance with the disclosed architecture.

Referring now to FIG. 8, there is illustrated a block diagram of a computing system 800 operable to execute claims authentication in accordance with the disclosed architecture. In order to provide additional context for various aspects thereof, FIG. 8 and the following discussion are intended to provide a brief, general description of a suitable computing system 800 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 8, the exemplary computing system 800 for implementing various aspects includes a computer 802, the computer 802 including a processing unit 804, a system memory 806 and a system bus 808. The system bus 808 provides an interface for system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and RAM 812, including an operating system 830, one or more application programs 832, other program modules 834 and program data 836. The one or more application programs 832, other program modules 834 and program data 836 can include the client application 108, abstraction layer 106 and authentication component 102 of FIG. 1, the system 200 and subcomponents of FIG. 2, the federation service 306, identity component 308 and, client 302 and extension 310 of FIG. 3, for example.

All or portions of the operating system, applications, modules, and/or data can also be cached in the RAM 812. It is to be appreciated that the disclosed architecture can be implemented with various commercially available operating systems or combinations of operating systems.

A user can enter commands and information into the computer 802 through one or more wire/wireless input devices, for example, a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the local network 852 through a wire and/or wireless communication network interface or adapter 856. The adaptor 856 may facilitate wire or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Figure 9:
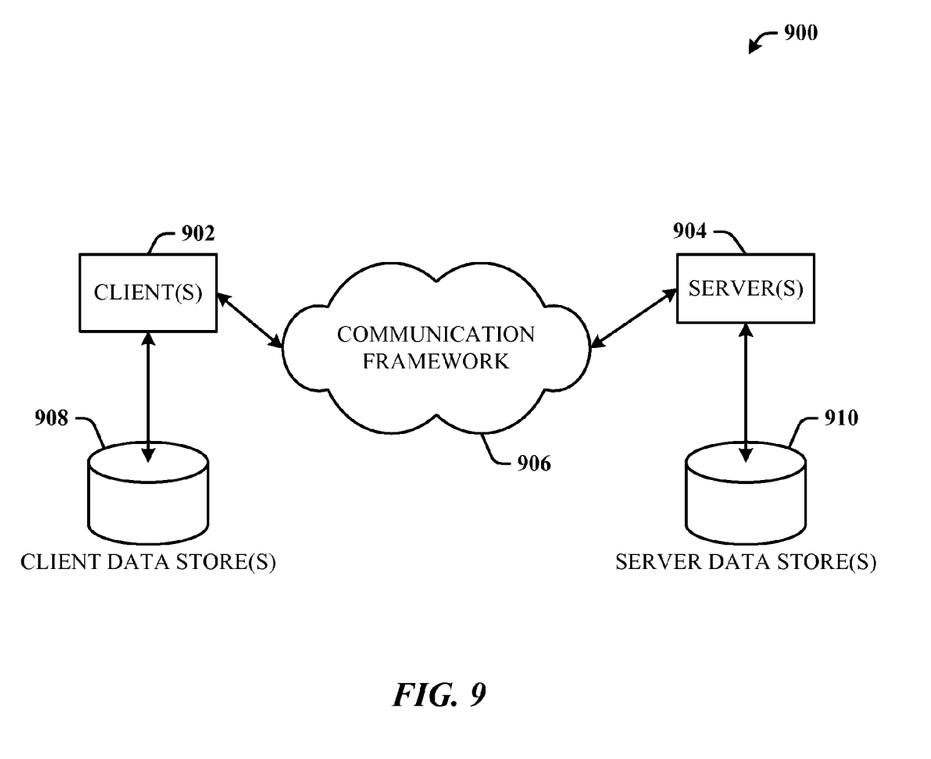
FIG. 9 illustrates a schematic block diagram of an exemplary computing environment for claims-based HTTP authentication.

Referring now to FIG. 9, there is illustrated a schematic block diagram of an exemplary computing environment 900 for claims-based HTTP authentication. The system 900 includes one or more client(s) 902. The client(s) 902 can be hardware and/or software (e.g., threads, processes, computing devices). The client(s) 902 can house cookie(s) and/or associated contextual information, for example.

The system 900 also includes one or more server(s) 904. The server(s) 904 can also be hardware and/or software (e.g., threads, processes, computing devices). The servers 904 can house threads to perform transformations by employing the architecture, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wire (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

The clients 902 can include the client application 108 of FIG. 1, the client application 202 of FIG. 2 and client 302 of FIG. 3. The servers 904 can include the web service 104 of FIG. 1, the server application 204 of FIG. 2 and web server 304 of FIG. 3.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented authentication system, comprising:
an authentication component that provides authentication to a web service based on claims, the authentication component utilizes a security support provider as a local plug-in to a client security subsystem that enables policy exchange for authentication between a legacy client application and the web service, the policy exchange facilitates selection of compatible claims for the authentication via an authentication header or unauthorized status code based on a token received from the web service;
an abstraction layer that provides abstraction of protocols that expose the authentication to the legacy client application for natively accessing the web service;
a client-side negotiator that negotiates among multiple client-side security support providers for the security support provider as suitable for handling the policy exchange using the protocols; and
a microprocessor that executes computer-executable instructions associated with each of the authentication component, the client-side negotiator, and the abstraction layer.

2. The system of claim 1, wherein the authentication component provides claims-based authentication by utilizing the security support provider via HTTP (hypertext transfer protocol).

3. The system of claim 1, wherein the authentication component includes the security support provider, the security support provider emulates ws-trust and ws-mex for authentication between the legacy client application and the web service.

4. The system of claim 3, wherein the security support provider is local to a client hosting the legacy client application and facilitates policy exchange between the legacy client application and the web service such that policy exchange is transparent to the client.

5. The system of claim 1, wherein the authentication component includes the security support provider that facilitates policy exchange via a WWW-Authenticate header.

6. The system of claim 5, wherein the policy exchange facilitates selection of the claims by the legacy client application when authenticating to the web service.

7. The system of claim 6, wherein the claims selected are compatible for authentication of the legacy client application to the web service.

8. The system of claim 1, wherein the legacy client application retries an HTTP request in response to receiving the authentication header from the web service.

9. The system of claim 1, wherein the authentication component is managed by a negotiate security service provider.

10. The system of claim 1, wherein the claims include statements about a user, the statements include at least one of name, identity, group, privilege, or capability.

11. A computer-implemented method of authenticating a client, comprising acts of:
sending a request for access from a client to a web server;
receiving a request for claims information from the web server;
negotiating among multiple local security support providers of a client security subsystem of the client for a suitable security support provider for handling the claims information, the suitable security support provider provides an abstraction of protocols that expose authentication to the client for natively accessing a federated service;
processing the request for claims information from the client to the federated service utilizing the suitable security service provider of the client security subsystem;
enabling policy exchange to select compatible claims associated with the claims information for the authentication via an authentication header or unauthorized status code based on a token received from the federated service;
receiving the claims information from the federated service;
authenticating the client to the web server based on the claims information to authenticate a legacy client application with the web server; and
utilizing a processor to execute instructions stored in memory to perform the acts of sending, receiving, negotiating, processing, enabling, and authenticating.

12. The method of claim 11, further comprising authenticating the client natively transparent to a client user.

13. The method of claim 11, wherein the client is authenticated to the web server using HTTP authentication.

14. The method of claim 11, further comprising receiving an unauthorized status code and an HTTP authorization header from the web server based on an acceptable authorization header from the client.

15. The method of claim 14, wherein the client automatically retries sending the request, which is an HTTP request, to the web server, passing an HTTP authorization header.

16. The method of claim 11, further comprising receiving a security policy token from the web server for negotiating a security support provider to the federated service.

17. The method of claim 16, wherein the security support provider employs a Web Service family of protocols for HTTP authentication of the client to the web server.

18. The method of claim 11, further comprising selecting a security policy to employ via a negotiate security support provider.

19. The method of claim 11, further comprising returning a success or failure message to the client from the web server.

20. A computer-implemented method of authenticating a legacy application, comprising acts of:
receiving a request for claims information from a web server in response to access by an application of a client to the web server;
negotiating among multiple local security support providers of a security subsystem of the client for a suitable security support provider for handling the claims information, the suitable security support provider provides an abstraction of protocols that expose authentication to the client for natively accessing a federated service, the suitable security support provider emulates a web services trust protocol and a web services metadata protocol;
processing the claims information to the federated service;
enabling policy exchange between the client and the web server via an authentication header or an unauthorized status code based on a token received from the federated service; and
utilizing a processor to execute instructions stored in memory to perform the acts of receiving, negotiating, processing, and enabling.

* * * * *